United States Patent
Xie

(10) Patent No.: US 10,613,374 B2
(45) Date of Patent: Apr. 7, 2020

(54) BACK LIGHT MODULE AND LIQUID CRYSTAL DISPLAY APPARATUS

(71) Applicants: XIAMEN TIANMA MICRO-ELECTRONICS CO., LTD., Xiamen (CN); TIANMA MICRO-ELECTRONICS CO., LTD., Shenzhen (CN)

(72) Inventor: Tianxu Xie, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 406 days.

(21) Appl. No.: 15/614,908

(22) Filed: Jun. 6, 2017

(65) Prior Publication Data
US 2017/0269429 A1     Sep. 21, 2017

(30) Foreign Application Priority Data

Nov. 30, 2016  (CN) .......................... 2016 1 1081852

(51) Int. Cl.
  *G02F 1/1335*   (2006.01)
  *F21V 8/00*     (2006.01)
(52) U.S. Cl.
  CPC ...... *G02F 1/133602* (2013.01); *G02B 6/0011* (2013.01); *G02F 2201/34* (2013.01)

(58) Field of Classification Search
  CPC ..................... G02F 1/133602; G02B 6/0011
  See application file for complete search history.

(56) References Cited

U.S. PATENT DOCUMENTS

| | | | |
|---|---|---|---|
| 2008/0068534 A1* | 3/2008 | Meng | G02F 1/133602 349/70 |
| 2008/0204625 A1* | 8/2008 | Lee | G02F 1/13452 349/58 |
| 2009/0086420 A1* | 4/2009 | Stockham | G06F 1/1616 361/679.26 |

FOREIGN PATENT DOCUMENTS

| | | |
|---|---|---|
| CN | 105302372 A | 2/2016 |
| CN | 105446538 A | 3/2016 |
| CN | 105975138 A | 9/2016 |

\* cited by examiner

*Primary Examiner* — Thomas M Sember
(74) *Attorney, Agent, or Firm* — Alston & Bird LLP

(57) ABSTRACT

A back light module and a liquid crystal display apparatus are provided A back light module has a conductive frame, connected electrically to a reference voltage input terminal; a sealant frame displaced inside the conductive frame, wherein the sealant frame has a bottom surface adhered to a top surface of the conductive frame; a support structure displaced above the top surface of the conductive frame along the inside edges of the sealant frame; and a plurality of optical films disposed over the conductive film and being supported by the support structure. The plurality of optical films includes an upper brightness enhancement film, a lower brightness enhancement film, a diffuser film, a light guide plate; and a reflector film.

19 Claims, 16 Drawing Sheets

BACK LIGHT MODULE AND LIQUID CRYSTAL DISPLAY APPARATUS

CROSS-REFERENCE TO RELATED APPLICATIONS

This application claims priority to a Chinese patent application No. CN201611081852.3, filed on Nov. 30, 2016, and entitled "Back Light Module and Liquid Crystal Display Apparatus", the disclosure of which is incorporated herein by reference in entirety.

TECHNICAL FIELD

The present disclosure relates to the field of display technologies, in particular to a back light module and a liquid crystal display apparatus.

BACKGROUND

With an increasing development of the display technology, a force touch technology has applied to various electronic devices. Compared with conventional planar touch technology, a Z axis function is added in the force touch technology so that a three-dimension (3D) touch effect is realized. More diversified operation experience has been brought to users.

A liquid crystal force touch apparatus in the existing art includes two force touch electrodes, and the force touch function is realized by measuring the variation in the capacitance value of a capacitor C constituted by the two force touch electrodes. One of the two force touch electrodes is disposed in a liquid crystal display panel, and an iron frame of a back light module is adopted as the other of the two force touch electrodes. Since tolerances exist between an actual size and a design size of films in the back light module and the liquid crystal display panel, and also between an actual assembly size and a design assembly size, a downside polarizer next to the back light module in the liquid crystal display panel may sink into an inner groove of a sealant frame of the back light module, narrowing the gap between the liquid crystal display panel and an optical film group in the black light module. Therefore, the variation in the capacitance value of the capacitor C becomes less when a same pressure is applied by a user, therefore causing a poor stability of the force touch.

SUMMARY

The present disclosure provides a back light module and a liquid crystal display apparatus for improving the stability of the force touch.

According to a first aspect, an embodiment of the present disclosure provides a back light module. The back light module includes: an optical film group, a sealant frame, a conductive frame and an annular support structure; The conductive frame is electrically connected to a reference voltage input terminal and adhered to a bottom surface of the sealant frame. The optical film group and the annular support structure are disposed in an accommodation space constituted by the sealant frame and the conductive frame. The annular support structure is disposed between the optical film group and the conductive frame and extends along an edge of the optical film group.

According to a second aspect, the present disclosure further provides a liquid crystal display apparatus including the back light module described in the first aspect and a liquid crystal display panel. The back light module and the liquid crystal display panel are disposed to be opposed to each other and connected by a light-proof tape.

The liquid crystal display panel includes a force touch electrode. The force touch electrode and the conductive frame of the back light module make up a force touch apparatus. There is a gap between the optical film group and the liquid crystal display panel.

BRIEF DESCRIPTION OF DRAWINGS

In order to more clearly illustrate the technical solution of the exemplary embodiments of the present disclosure, a brief description of the accompanying drawings to be used in the description of the embodiments is given below. Apparently, the accompanying drawings are merely illustrative of a part of the embodiments described in the present disclosure rather than all accompanying drawings. Those skilled in the art may obtain other accompanying drawings based on these accompanying drawings without paying creative work.

DETAILED DESCRIPTION

In order to make the apparatus, the technical solution and the advantages of the present disclosure more clear, the technical solution of the present disclosure will be further completely described below in conjunction with the accompanying drawings and embodiments. Apparently, the embodiments disclosed herein are parts of the embodiments of the present disclosure rather than all embodiments. All other embodiments obtained by those skilled in the art based on the embodiments of the present disclosure and without paying creative work fall into the protection scope of the present disclosure.

Figure 1:
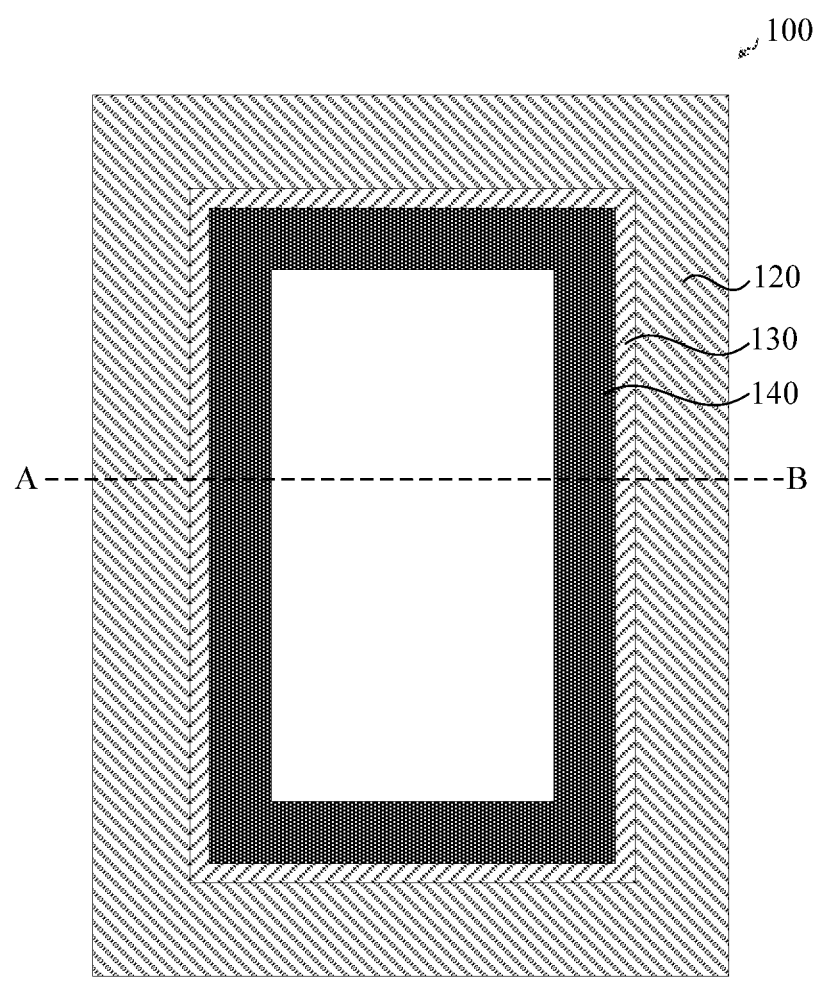
FIG. 1 is a top view of a structure of a back light module according to an embodiment of the present disclosure.

FIG. 1 is a schematic plan view showing a structure of a back light module according to an embodiment of the present disclosure. It should be noted that only a part of the structure of a back light module 100 is illustrated in FIG. 1 for more clearly showing the arrangement of an annular support structure 140. As shown in FIG. 1, the back light module 100 includes a sealant frame 120, a conductive frame 130 and the annular support structure 140 extending along an edge of an optical film group 110.

Figure 2:
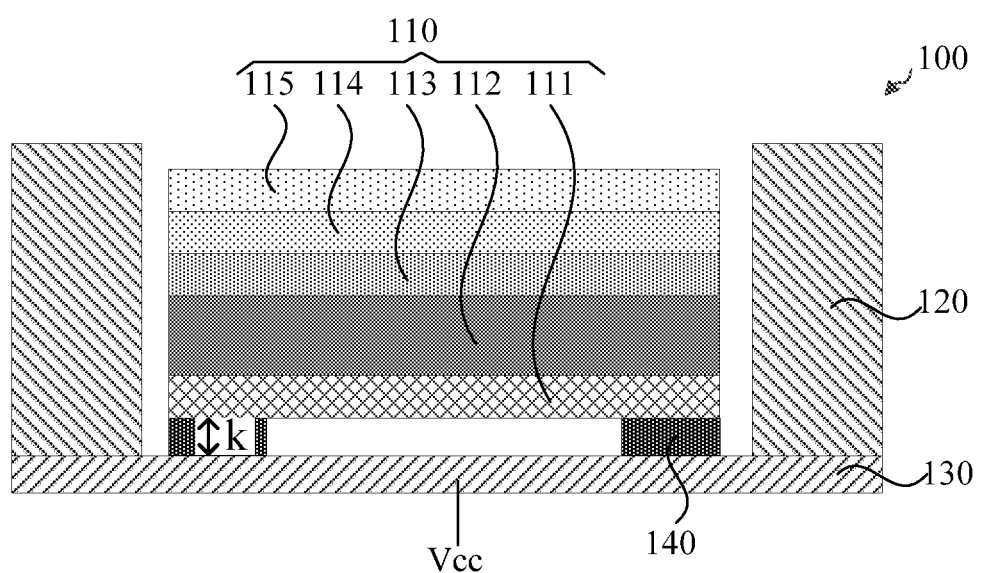
FIG. 2 is a a cross sectional view of the structure taken along a dotted line AB in FIG. 1.
Figure 3:
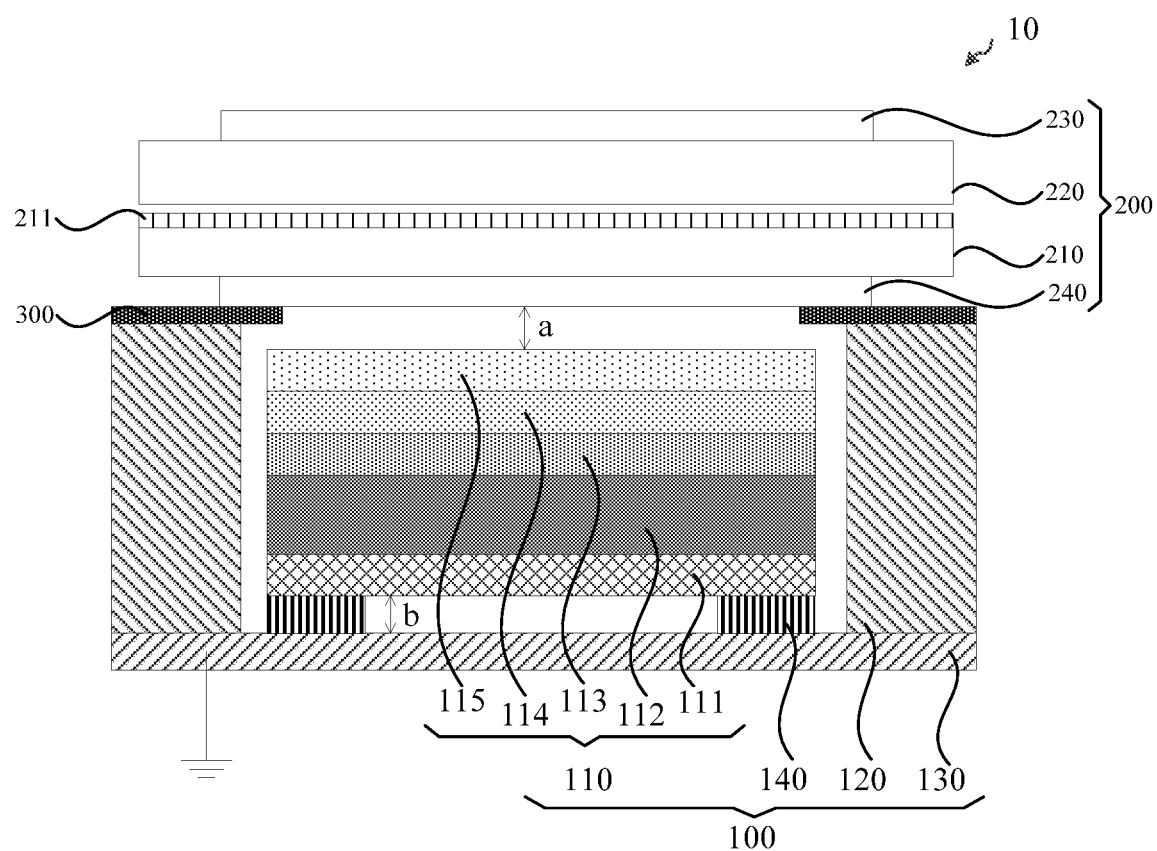
FIG. 3 is a a cross sectional view of the liquid crystal display apparatus according to an embodiment of the present disclosure.

FIG. 2 is a schematic view showing a cross sectional structure taken along a dotted line AB in FIG. 1. FIG. 3 is a schematic view showing a structure of a liquid crystal display apparatus according to an embodiment of the present disclosure. As shown in FIG. 2, in addition to the sealant frame 120, the conductive frame 130 and the annular support structure 140, the back light module 100 further includes the optical film group 110. The conductive frame 130 is electrically connected to a reference voltage input terminal Vcc and adhered to a bottom surface of the sealant frame 120. The optical film group 110 and the annular support structure 140 are disposed in an accommodation space constituted by the sealant frame 120 and the conductive frame 130; and the annular support structure 140 is disposed between the optical film group 110 and the conductive frame 130.

The back light module 100 provided by the present embodiment includes the optical film group 100, the sealant frame 120, the conductive frame 130 and the annular support structure 140. The conductive frame 130 is electrically connected to the reference voltage input terminal Vcc and adhered to the bottom surface of the sealant frame 120. The optical film group 110 and the annular support structure 140 are disposed in the accommodation space constituted by the sealant frame 120 and the conductive frame 130. The annular support structure 140 is disposed between the optical film group 110 and the conductive frame 130 and extends along the edge of the optical film group 110. Therefore, the conductive frame 130 can be multiplexed as a force touch electrode, and constitutes the force touch apparatus together with the other force touch electrode in the liquid crystal display panel. In addition, a gap is formed between the optical film group 110 and the conductive frame 130 due to the arrangement of the annular support structure 140. The gap can be served as a main gap between a force touch electrode 211 and the conductive frame 130 when the gap between the liquid crystal display panel and optical film group 110 is relatively small, so that an instability phenomenon of the force touch signal, which occurs when the gap between the liquid crystal display panel and the optical film group 110 decreases due to the tolerance of the component size or the tolerance of assembly size, is avoided, and an effect of improving the stability of the force touch is realized.

It should be noted that since there is a gap between the optical film group 110 and the conductive frame 130 after a liquid crystal display apparatus is constituted by the back light module 100 and the liquid crystal display panel, the optical film group 110 may be recessed toward the conductive frame 130 under a pressing operation of a user, thereby realizing the detection of the force touch. Therefore, in order for the liquid crystal display apparatus to have a greater force touch range, the width thickness of the annular support structure 140 cannot be set too large inside the gap.

Further referring to FIG. 2, the optical film group 110 may include an upper brightness enhancement film 115, a lower brightness enhancement film 114, a diffuser 113, a light guide plate 112 and a reflector 111. It should be understood that the types and quantities of the optical films in the optical film group are not limited to the above description. Depending on the design requirements, the embodiment is not particularly limited thereto.

In the present embodiment, the conductive frame 130 may be adhered to the bottom surface of the sealant frame 120 by a double sided adhesive tape. The bottom surface of the sealant frame 120 refers to a surface, closing the reflector 111 of the optical film group 110, of the sealant frame 120. It should be noted that the structure for connecting the conductive frame 130 and the sealant frame 120 is not limited to the double sided adhesive tape, and may contain other connection structure. The connection technique between the conductive frame 130 and the sealant frame 120 is not limited to adhesives, and the conductive frame 130 and the sealant frame 120 may be connected by other manners. For example, relevant bonding structures may be provided on the conductive frame 130 or on the sealant frame 120, respectively, and the connection between the conductive frame 130 and the sealant frame 120 is realized by bonding other structures. The conductive frame 130 can play a role in protecting the optical film group 110, as well as and supporting a base and preventing an electrostatic charge.

As shown in FIG. 2, the conductive frame 130 is in a flat plate shape. It should be understood that, as long as the above function of the conductive frame 130 can be realized, the conductive frame 130 may be of other shapes. For example, the conductive frame 130 may be in the form of a vessel, which includes a bottom plate and a side wall connected to the bottom plate and extending along the edge of the bottom plate.

Optionally, the conductive frame 130 may be an iron frame. The iron frame has a common structure of the conductive frame 130 in the back light module 100 in the existing art, and does not need to be specifically designed and can be purchased and used directly. It should be noted that the conductive frame 130 may also be a metal foil, for example, an aluminum foil and a copper foil.

Further, the annular support structure 140 may be an annular single-sided adhesive tape. An adhesive layer of the annular single-sided adhesive tape is disposed at a side closing the iron frame of the annular single-sided adhesive tape, and the annular single-sided adhesive tape is connected to the iron frame through the adhesive layer. It should be understood that when the conductive frame 130 is another structure other than the iron frame, the adhesive layer of the annular single-sided adhesive tape is disposed at a side, close to the above structures, of the annular single-sided adhesive tape. In this case, close to the reflector 111, a side of the annular light-proof tape is not adhered to the reflector 111. Such an arrangement can avoid the problem that the reflector 111 is damaged due to the differences in the material thermal expansion coefficients and shrinkages between the reflector 111 and the conductive frame 130. Although the optical film group 110 is not fixed to the annular support structure 140, the normal operation of the back light module 100 will not be affected, since the gap between the optical film group 110 and an inner wall of the sealant frame 120 is small.

Optionally, the annular support structure 140 may also be a plastic annular support frame. Unlike the annular single-sided adhesive tape, both of the surface close to the conductive frame 130 and the surface away from the conductive frame 130 of the plastic annular support frame are not provided with an adhesive layer. The plastic annular support frame is neither connected to the conductive frame 130 nor connected to the reflector 111. Therefore, the reflector 111 will not be damaged due to the differences in the material thermal expansion coefficients and shrinkage between the reflector 111 and the conductive frame 130, and problems such as deformation between the unconnected plastic annular support frame and the conductive frame 130 due to thermal expansion coefficient mismatch of materials will not occur. It should be understood that, in addition to the plastic material, the annular support structure 140 may also use other materials that are non-destructive to the reflector 111 and the conductive frame 130. Here the width of a gap is defined as the narrow side of the gap. However, in order to accurately detect the variation in the width of the gap between the conductive frame 130 and the optical film group 110 under the user's pressing force, the elasticity of the annular support structure 140 cannot be excessively large.

In the present embodiment, a value range of the thickness K of the annular support structure 140 may be 0.1-0.3 millimeter. If the thickness K of the annular support structure 140 is too small, it cannot server as the main gap between the conductive frame 130 and a force touch electrode 211 of the force touch apparatus, therefore, the design goal cannot be achieved. If the thickness K of the annular support structure 140 is too large, the overall thickness of the conductive frame 130 and the optical film group 110 is increased, and the thickness of the sealant frame 120 is increased accordingly. As a result, the overall thickness of the liquid crystal display apparatus is increased, which is contrary to the slim requirements of the user for the liquid crystal display apparatus. In view of the above-mentioned problems, the thickness K of the annular support structure 140 is set in a range of 0.1 to 0.3 mm in the present embodiment.

FIG. 3 is a schematic view showing a structure of a liquid crystal display apparatus according to an embodiment of the present disclosure. As shown in FIG. 3, a liquid crystal display apparatus 10 includes a liquid crystal display panel 200 and the back light module 100 of any embodiment of the present disclosure. The back light module 100 and the liquid crystal display panel 200 are arranged to be opposed to each other, and connected by a light-proof adhesive tape 300. The liquid crystal display panel 200 includes a force touch electrode 211. The force touch electrode 211 and the conductive frame 130 of the back light module 100 constitute the force touch apparatus. There exists a gap "a" between the optical film group 110 and the liquid crystal display panel 200.

The liquid crystal display apparatus 10 provided by the present embodiment includes the liquid crystal display panel 200 and the back light module 100 of any embodiment of the present disclosure. The back light module 100 and the liquid crystal display panel 200 are arranged to be opposed to each other and connected by the light-proof adhesive tape 300. The liquid crystal display panel 200 includes the force touch electrode 211. The force touch electrode 211 and the conductive frame 130 of the back light module 100 constitute the force touch apparatus. There exists the gap "a" between the optical film group 110 and the liquid crystal display panel 200. The gap "a" can be served as the main gap between the force touch electrode 211 and the conductive frame 130 when the gap "b" between the conductive frame 130 and the optical film group 110 is relatively small. Therefore, the instability phenomenon of the force touch signal, which occurs when the gap "a" decreases due to the tolerance of the component size or the tolerance of assemble size, is avoided, and the effect of improving the stability of the force touch is realized.

Figure 4:
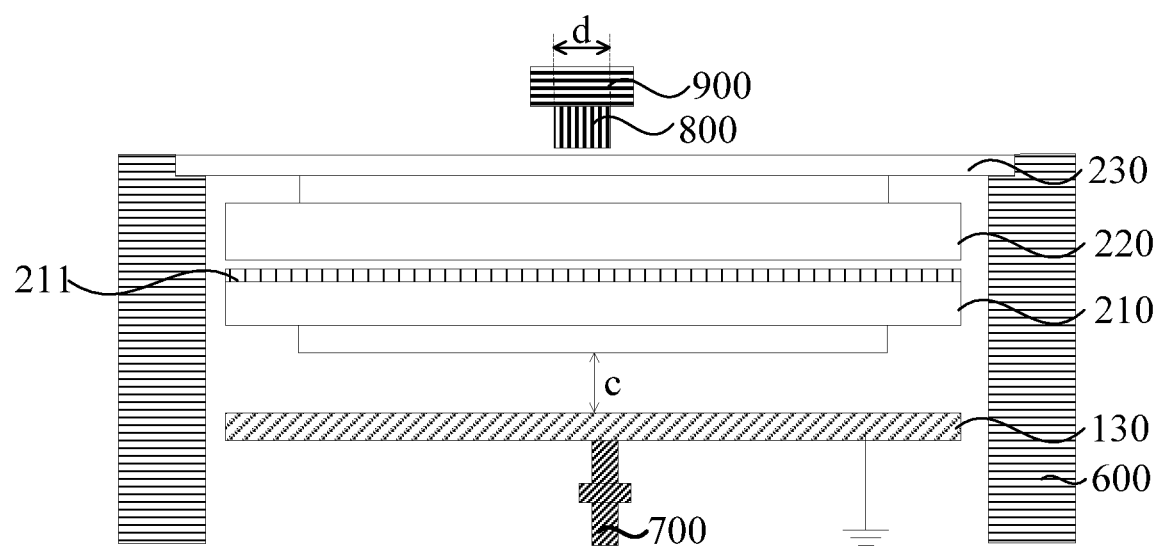
FIG. 4 is a schematic view showing an experimental setup according to an embodiment of the present disclosure.

It should be noted that, when a same pressure is applied by the user, the variation in the capacitance value of the capacitor constituted by the force touch electrode 211 and the conductive frame 130 increases firstly and then decreases with the increasing of an intrinsic gap width of any gap between the pressure touch electrode 211 and the conducting frame 130. Herein, the intrinsic gap width refers to the gap width of any gap when no pressure is applied by the user. It should be noted that, since the liquid crystal display apparatus 10 tends to be slim, each gap between the conductive frame 130 and the force touch electrode 211 in the liquid crystal display apparatus 10 is relatively small and does not reach the intrinsic gap width corresponding to the maximum variation in the above capacitance value. Therefore, the variation in the capacitance value of the capacitor constituted by the force touch electrode 211 and the conductive frame 130 increases with the increasing of the intrinsic gap width of any gap between the force touch electrode 211 and the conductive frame 130. Specifically, FIG. 4 is a schematic view showing an experiment according to an embodiment of the present disclosure. As shown in FIG. 4, the liquid crystal display panel 200 provided with the force touch electrode 211 is erected on a fixing station 600 by a cover glass located at a side, away from an array substrate 210, of a color filter substrate 220, the grounded conductive frame 130 is fixed to a height-adjustable fixture 700, and the optical film group (not shown) is placed on a side, close to the liquid crystal display apparatus 200, of the grounded conductive frame 130, so as to simulate a normal environment of the back light module. In this case, the force touch electrode 211 and the grounded conductive frame 130 can be used for simulating the force touch apparatus of the liquid crystal display apparatus, and the gap "c" is the gap there between. During the experiment, an indenter 800 with a diameter "d" of 8 mm and a weight 500 gram (as 900) are placed at the top side, away from the grounded conductive frame 130, of the liquid crystal display panel 200 for simulating the user's constant pressing force.

Figure 5:
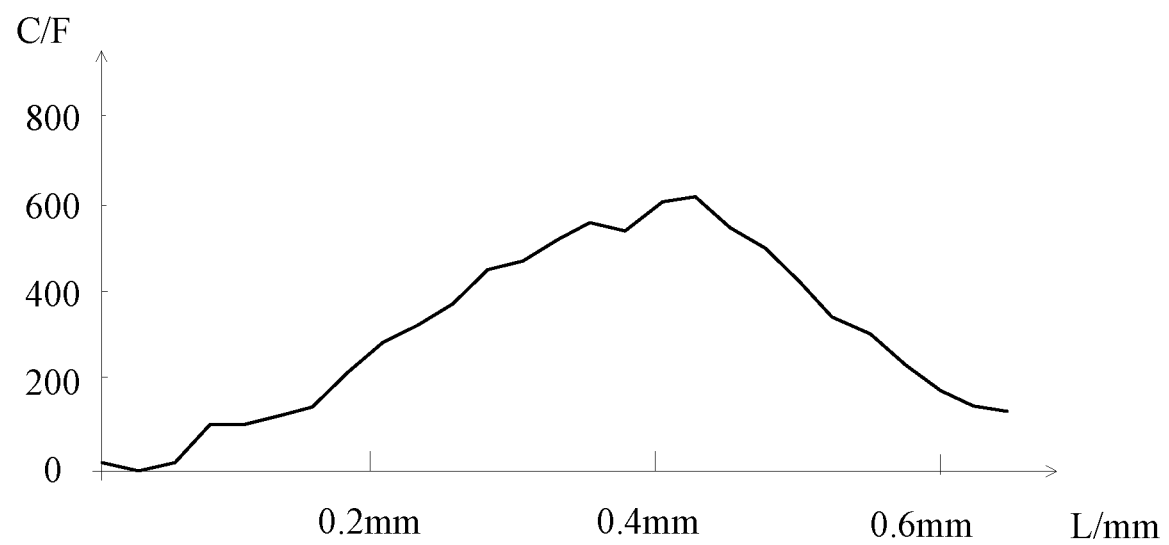
FIG. 5 is diagram showing a relationship between an inherent gap and a variation in capacitance obtained by the experimental setup in FIG. 4.

FIG. 5 is a schematic view showing a relationship between an inherent gap and a variation in capacitance across the gap obtained by the experiment setup in FIG. 4, which supports the above conclusion about the relationship between the change of capacitance and the change of the intrinsic gap. Herein, the capacitance refers to the capacitance of a capacitor constituted by the grounded conductive frame 130 and the force touch electrode 211. As shown in FIG. 5, the intrinsic width corresponding to the maximum variation in capacitance is about 0.45 mm. Although the intrinsic width corresponding to the maximum variation in capacitance is fluctuating due to the variation of some parameters, the fluctuation range is not large since main components are the same. Therefore, a small gap between the force touch electrode 211 and the conductive frame 130 in the liquid crystal display apparatus conforms to the law before the maximum variation in the capacitance is reached.

Figure 6:
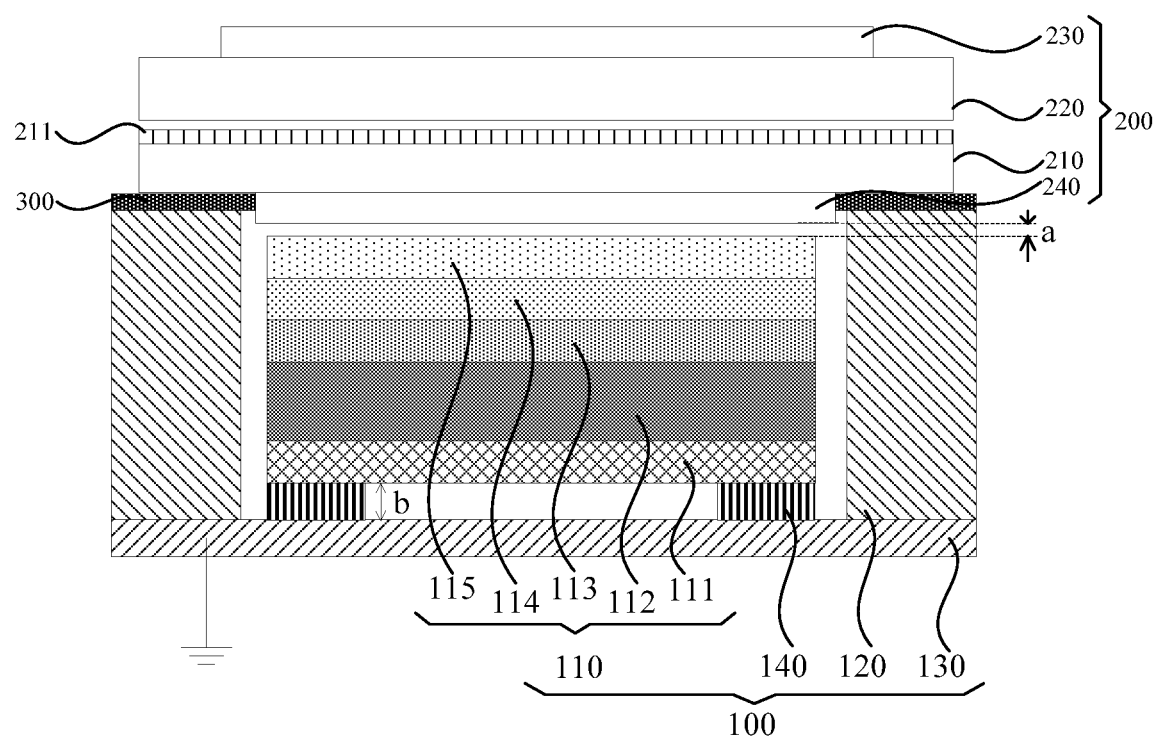
FIG. 6 is a cross sectional view of another liquid crystal display apparatus according to an embodiment of the present disclosure.

Based on the above analysis, as shown in FIG. 3, in the present embodiment, the liquid crystal display panel 200 includes an upper polarizer 230 and a lower polarizer 240. The lower polarizer 240 is disposed adjacent to the back light module 100. As shown in FIG. 6, the lower polarizer 240 may sink into the gap "a" between the optical film group 110 and the liquid crystal display panel 200 in the following cases: when there are tolerances between the actual sizes and designed sizes of the lower polarizer or each component in the back light module 100, or there are tolerances when the internal components of the back light module 100 or the liquid crystal display panel 200 being assembled, or there is a tolerance when the liquid crystal display panel 200 and the back light module 100 being assembled. In this case, the gap "a" between the liquid crystal display panel 200 and the back light module 100 becomes less, resulting in a decrease in the variation in the capacitance value of the capacitor constituted by the force touch electrode 211 and the conductive frame 130 under a same pressing force exerted by the user, and the stability of the force touch signal decreased. In order to solve the above problem, the annular support structure 140 is disposed between the optical film group 110 and the conductive frame 130 of the back light module 100, so that there is a gap "b" between the conductive frame 130 and the optical film group 110. Since the width of the gap "b" is mainly restricted by the thickness of the annular support frame 140, the width of the gap "b" does not change when there are tolerances between the actual sizes and the designed sizes of the parts or tolerances in assembling of the parts. Therefore, it is ensured that the gap between the conductive frame 130 and the force touch electrode in the force touch apparatus 10 is big enough (still less than the intrinsic gab width corresponding to the maximum variation of the capacitance), and achieves the beneficial effect of improving the stability of the force touch.

It is to be noted that the force touch electrode and the conductive frame 130 are provided in the liquid crystal display panel 200 and the back light module 100, respectively, and the gap there between includes the gap "a" between the optical film group 110 and the liquid crystal display panel 200 and the gap "b" between the conductive frame 130 and the optical film group 110. When the user performs the force touch operation, the liquid crystal display panel 200 is deformed toward the back light module 100 firstly, and the gap "a" between the optical film group 110 and the liquid crystal display panel 200 decreases. When the gap "a" between the optical film group 110 and the liquid crystal display panel 200 decreases to zero, the user continues to increase the pressing force, and thus the liquid crystal display panel 200 and the optical film group 110 are deformed together toward the conductive frame 130. As a result, the gab "b" between the conductive frame 130 and the optical film group 110 decreases.

Figure 7:
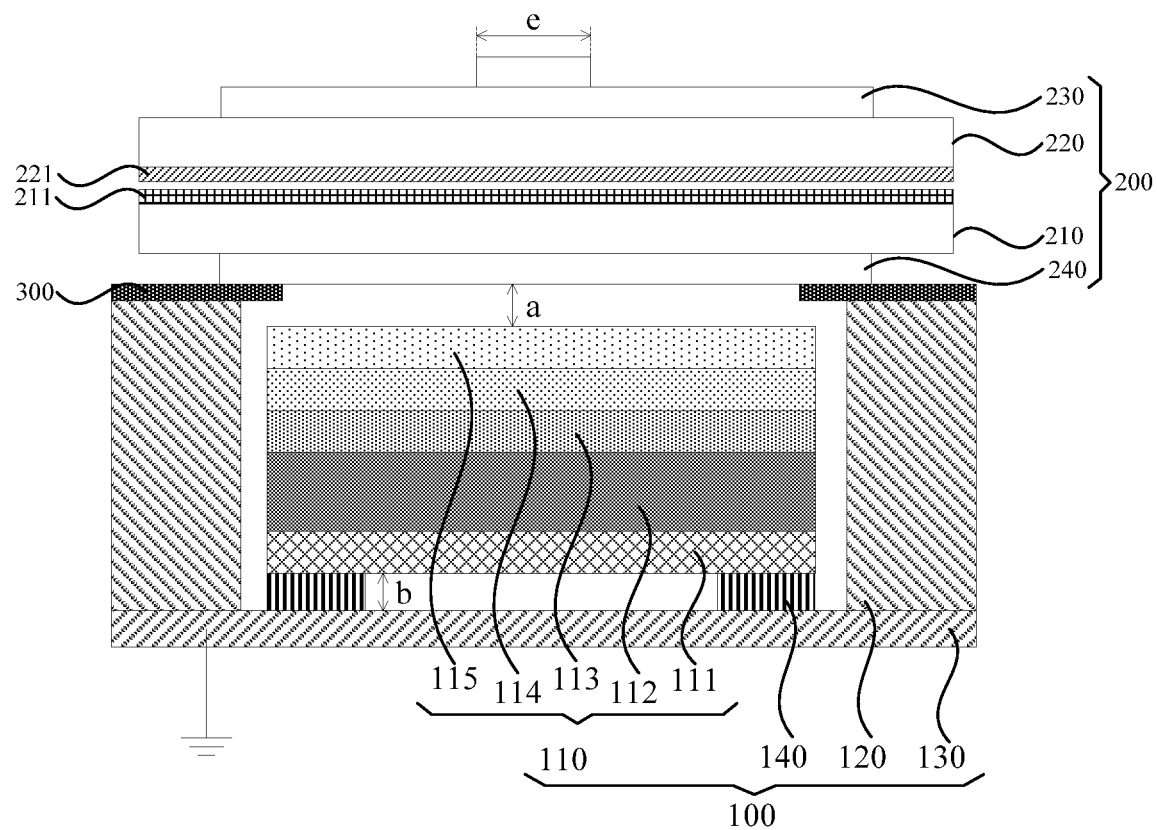
FIG. 7 is a schematic view showing another experimental setup according to an embodiment of the present disclosure.
Figure 8:
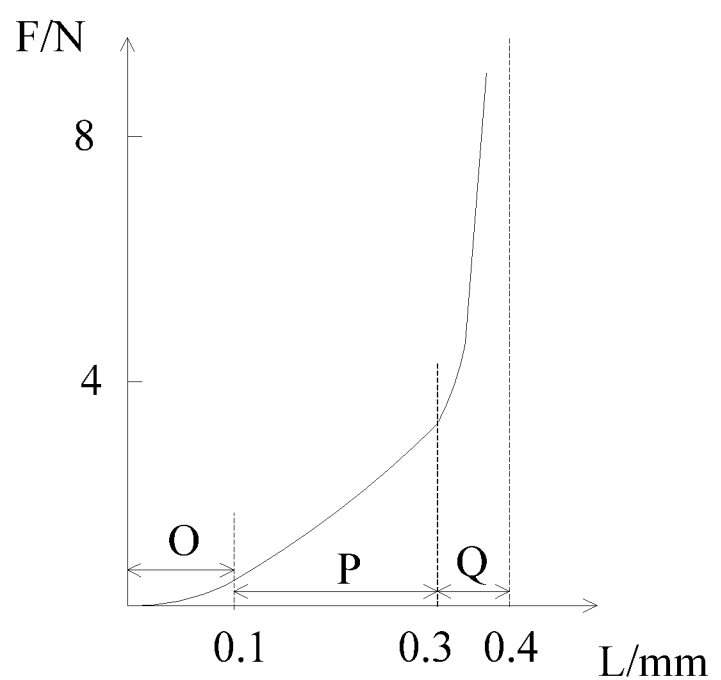
FIG. 8 is a diagram showing the result of the experiment in FIG. 7.

It is to be understood that the gap "b" between the conductive frame 130 and the optical film group 110 is the main gap in use when the gap "a" between the optical film group 110 and the liquid crystal display panel 200 is small. For ease of calculation, when the gap "a" between the optical film group 110 and the liquid crystal display panel 200 is less than a threshold, the gap "a" can be omitted and the width of the gap "b" between the conductive frame 130 and the optical film group 110 is regarded as the gap width between the force touch electrode and the conductive frame 130. However, when the gap "a" between the optical film group 110 and the liquid crystal display panel 200 is greater than the threshold, the gap "a" should not be omitted. In this case, assuming that the gap "a" between the optical film group 110 and the liquid crystal display panel 200 decreases to zero when the pressing force applied by the user is "A", the gap "a" between the optical film group 110 and the liquid crystal display panel 200 decreases gradually with the increasing of the user's pressing force when the pressing force applied by the user is less than "A". When the pressing force applied by the user is greater than "A" and the gap "b" between the conductive frame 130 and the optical film group 110 is not less than zero, the gap "b" between the conductive frame 130 and the optical film group 110 decreases gradually with the increasing of the user's pressing force. It should be noted that when the pressing force applied by the user is less than "A", the user's pressing force only acts on each film of the liquid crystal display panel 200, so that the liquid crystal display panel 200 as a whole is deformed toward the optical film group 110. While the pressing force applied by the user is greater than "A" and the gap "b" between the conductive frame 130 and the optical film group 110 is not less than zero, the user's pressing force also acts on each optical film in addition to each film of the liquid crystal display panel 200, so that the liquid crystal display panel 200 is deformed toward the conductive frame 130 together with the optical film group 110. It should be understood that a pressing force applied by a user can induce a greater deformation to the liquid crystal display panel 200 and the optical film group 110 combined than a deformation to the liquid crystal display panel 200 alone. Therefore, a coefficient fraction of the pressing force applied by the user to the width of the gap "a" when the pressing force from the user is smaller than a preset force (?) is less than a proportional coefficient of the pressing force applied by the user to the width variation of the gap "b" when the pressing force applied by the user is greater than "A" and the gap "b" between the conductive frame 130 and the optical film group 110 is not less than zero. When there exists at least one gap between the force touch electrode and the conductive frame 130, a total variation in the width gap of the gap, either a or b, is the variation of the distance between the force touch electrode and the conductive frame 130. As can be seen, the proportional coefficient of the pressing force applied by the user to the variation in the distance between the force touch electrode and the conductive frame 130 when the pressing force applied by the user is less than "A" is less than the proportional coefficient of the pressing force applied by the user to the variation in the distance between the force touch electrode and the conductive frame 130 when the pressing force applied by the user is greater than "A" and the gap "b" between the conductive frame 130 and the optical film group 110 is not less than zero. Further, after the gap between the conductive frame 130 and the optical film group 110 decreases to zero, if the user continues to apply the pressing force, the inner structures of the liquid crystal display panel 200 and each film in the back light module 100 may risk being extruded and deformed, the proportional coefficient of the pressing force applied by the user to the variation in the distance between the force touch electrode and the conductive frame 130 continues to increase, and the proportional coefficient of the pressing force applied by the user to the variation in the distance between the force touch electrode and the conductive frame 130 increases faster since the internal structure of the film is not easily deformed. Another experiment has been performed on a liquid crystal display apparatus to verify the above conclusion. FIG. 7 is a schematic view showing the other experimental setup according to one embodiment of the present disclosure. As shown in FIG. 7, the width of the gap "a" between the optical film group 100 and the liquid crystal display panel 200 of the liquid crystal display apparatus is 0.1 mm, the width of the gap "b" between the optical film group 110 and the conductive frame 130 is 0.2 mm, the side of the liquid crystal display panel 200 away from the back light module 100 is pressed by an indenter with a diameter "e" of 8 mm at a velocity of 0.6 mm/min, the relationship between the pressing force and the variation in the distance between the force touch electrode and the conductive frame 130 is obtained. As shown in FIG. 8, the stage O denotes a process during which the gap "a" between the liquid crystal display panel 200 and the optical film group 110 decreases gradually to zero; the stage P denotes a process during which the gap "b" between the conductive frame 130 and the optical film group 110 decreases gradually to zero; and the stage Q denotes a process after the gap "b" between the conductive frame 130 and the optical film group 110 has decreased to zero. A slop of the curve in each stage refers to the proportional coefficient of the pressing force to the variation in the distance between the force touch electrode and the conductive frame 130 in the stage. The conclusion about the above proportional coefficient of the pressing force to the variation in the distance between the force touch electrode and the conductive frame 130 in each stage is further proved by means of experiment.

In the present embodiment, the conductive frame 130 is grounded. Both the force touch electrode and the conductive frame 130 need to have a fixed potential so that a capacitor can be formed there between, and the force touch detection can be realized based on the variation in the capacitance value of the capacitor. In the present embodiment, the conductive frame 130 may be grounded, so that the conductive frame 130 has a ground potential. In addition, grounding the conductive frame 130 facilitates enhancing the electrostatic protection of the conductive frame 130.

Optionally, the width of the gap "a" between the optical film group 110 and the liquid crystal display panel 200 may be not greater than the thickness of the annular light-proof adhesive tape 300, so that the gap "b" between the optical film group 110 and the conductive frame 130 can be served as the main gap between the force touch electrode and the conductive frame 130. Since the gap "b" is less affected by the tolerance of size or assembly, a phenomenon that the intrinsic gap between the force touch electrode and the conductive frame 130 decreases due to the tolerance of size or assembly is avoided by arranging the gap "b" as the main gap, and an effect of improving the stability of the force touch is realized.

Specifically, the range of the width of the gap "a" between the optical film group 110 and the liquid crystal display panel 200 may be 0~0.3 mm. The overall thickness of the liquid crystal display apparatus will be increased if the gap "a" is set to be too large. In order not to affect the slim of the liquid crystal display apparatus, the width of the gap "a" is set to be not greater than 0.3 mm.

Figure 9:
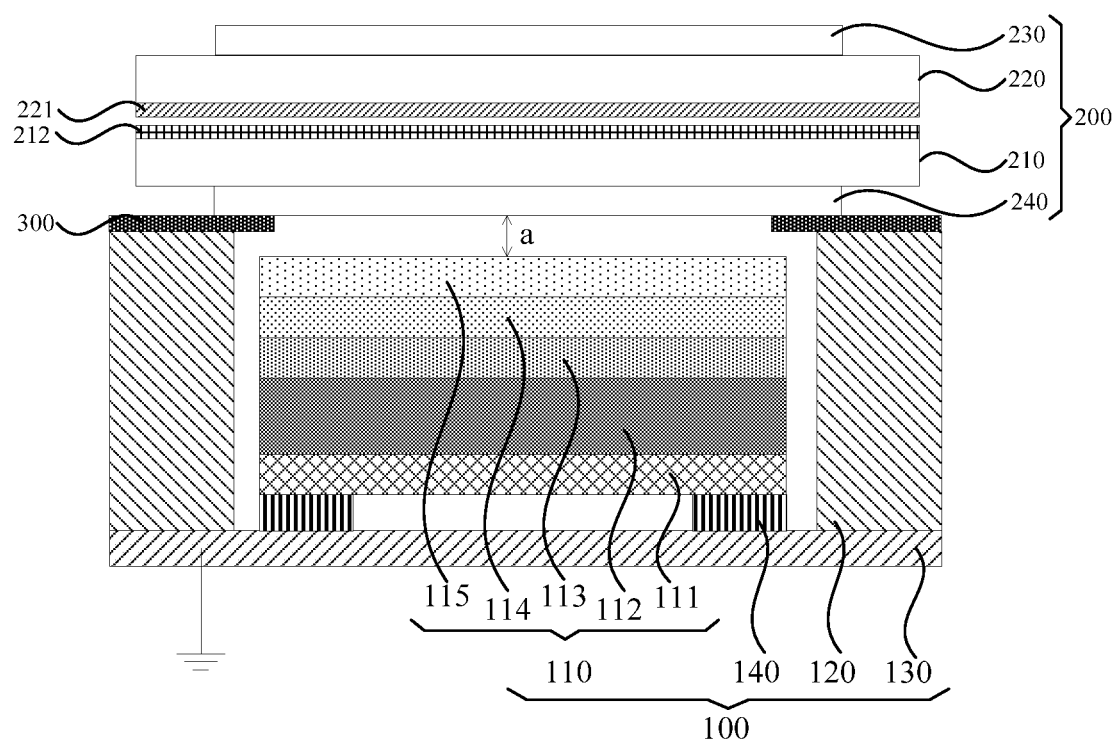
FIG. 9 is a schematic view showing a structure of yet another liquid crystal display apparatus according to an embodiment of the present disclosure.

FIG. 9 is a schematic view showing a structure of yet another liquid crystal display apparatus according to an embodiment of the present disclosure. As shown in FIG. 9, the liquid crystal display apparatus includes a back light module 100 of any embodiment of the present disclosure and a liquid crystal display panel 200. The back light module 100 and the liquid crystal display panel 200 are disposed opposed to each other and connected by a light-proof adhesive tape 300. The liquid crystal display panel 200 includes a force touch electrode. The force touch electrode and the conductive frame 130 of the back light module 100 constitute a force touch apparatus. There exists a gap "a" between the optical film group 110 and the liquid crystal display panel 200. The liquid crystal display panel 200 includes a touch sensing electrode 221 and a touch driving electrode 212. The touch sensing electrode 221 or the touch driving electrode 212 is multiplexed as the force touch electrode. The liquid crystal display panel 200 includes an array substrate 210 and a color filter substrate 220 opposed to each other. The touch driving electrode 212 is disposed on the array substrate 210, and the touch sensing electrode 221 is disposed on the color filter substrate 220.

It should be noted that each of the array substrate 210 and the color filter substrate 220 includes a multi-layer structure. The touch driving electrode 212 and the touch sensing electrode 221 may disposed at any film position of the array substrate 210 and the color filter substrate 220, under a premise that the touch driving electrode 212 and the touch sensing electrode 221 are capable of realizing the touch function and have no effect on other structural functions. That is, the touch driving electrode 212 and the touch sensing electrode 221 may be disposed at the intermediate film layer of the array substrate 210 and the color filter substrate 220, or may be disposed at a side of the array substrate 210 closing the color filter substrate 220 or a side of the color filter substrate 220 closing the array substrate 210.

Figure 10:
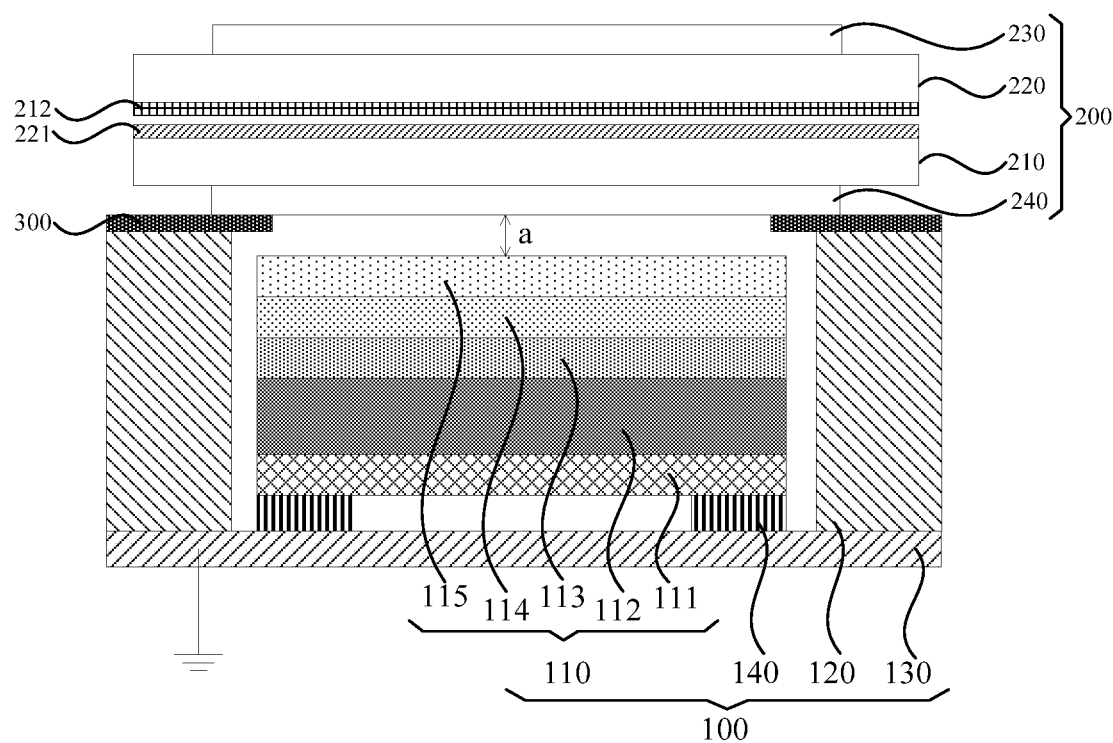
FIG. 10 is a schematic view showing a structure of yet another liquid crystal display apparatus according to an embodiment of the present disclosure.

FIG. 10 is a schematic view showing a structure of yet another liquid crystal display apparatus according to an embodiment of the present disclosure. As shown in FIG. 10, the liquid crystal display apparatus includes a back light module 100 of any embodiment of the present disclosure and a liquid crystal display panel 200. The back light module 100 and the liquid crystal display panel 200 are disposed opposed to each other and connected by a light-proof adhesive tape 300. The liquid crystal display panel 200 includes a force touch electrode. The force touch electrode and the conductive frame 130 of the back light module 100 constitute a force touch apparatus. There exists a gap "a" between the optical film group 110 and the liquid crystal display panel 200. The liquid crystal display panel 200 includes a touch sensing electrode 221 and a touch driving electrode 212. The touch sensing electrode 221 or the touch driving electrode 212 is multiplexed as the force touch electrode. The liquid crystal display panel 200 includes an array substrate 210 and a color filter substrate 220 opposed to each other. The touch driving electrode 212 is disposed on the color filter substrate 220, and the touch sensing electrode 221 is disposed on the array substrate 210. The optical film group 110 may include an upper brightness enhancement film 115, a lower brightness enhancement film 114, a diffuser 113, a light guide plate 112 and a reflector 111.

Figure 11:
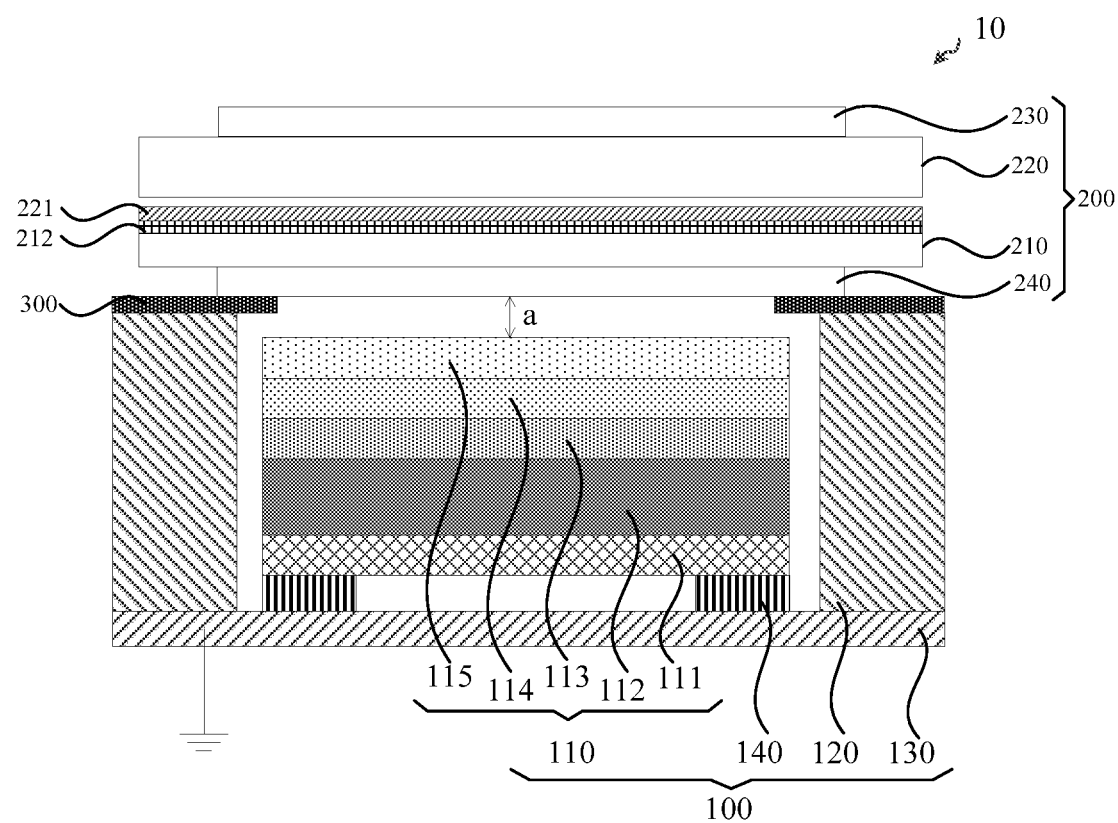
FIG. 11 is a schematic view showing a structure of yet another liquid crystal display apparatus according to an embodiment of the present disclosure.
Figure 12:
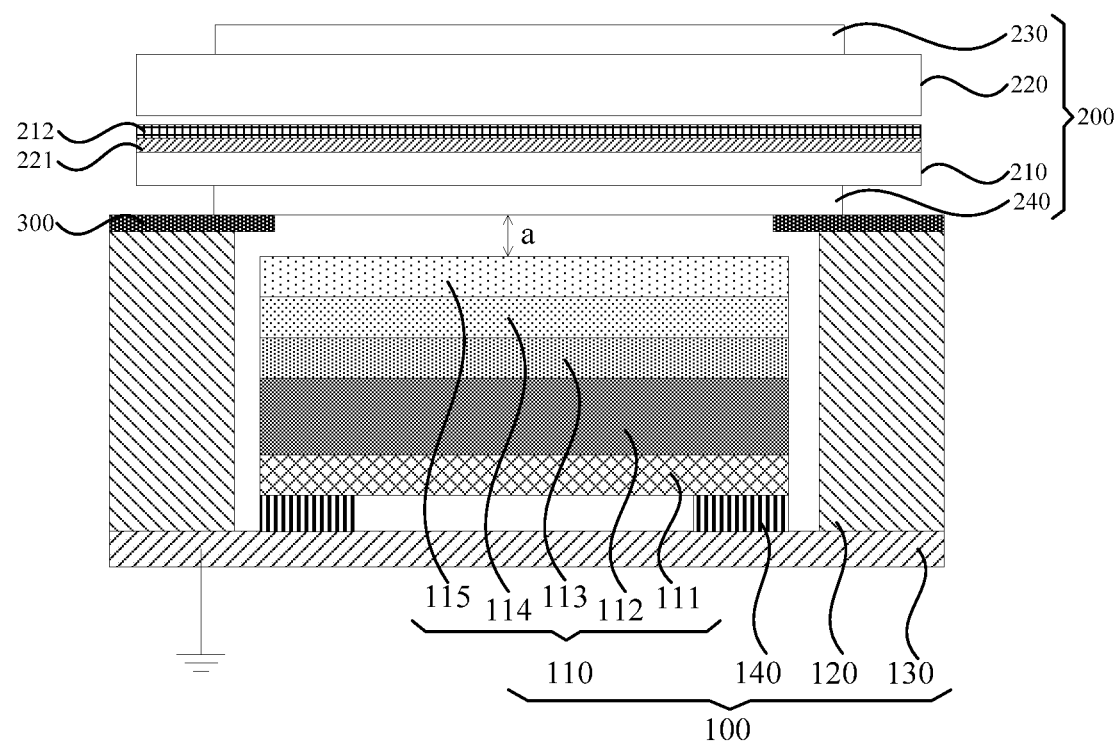
FIG. 12 is a schematic view showing a structure of yet another liquid crystal display apparatus according to an embodiment of the present disclosure.

FIG. 11 is a schematic view showing a structure of yet another liquid crystal display apparatus according to an embodiment of the present disclosure. As shown in FIG. 11, the liquid crystal display apparatus includes a back light module 100 of any embodiment of the present disclosure and a liquid crystal display panel 200. The back light module 100 and the liquid crystal display panel 200 are disposed opposed to each other and connected by a light-proof adhesive tape 300. The liquid crystal display panel 200 includes a force touch electrode. The force touch electrode and the conductive frame 130 of the back light module 100 constitute a force touch apparatus. There exists a gap "a" between the optical film group 110 and the liquid crystal display panel 200. The liquid crystal display panel 200 includes a touch sensing electrode 221 and a touch driving electrode 212. The touch sensing electrode 221 or the touch driving electrode 212 is multiplexed as the force touch electrode. The liquid crystal display panel 200 includes an array substrate 210 and a color filter substrate 220 opposed to each other. Both of the touch driving electrode 212 and the touch sensing electrode 221 are disposed on the array substrate 210. It should be noted that, in the present embodiment, the positional relationship between the touch driving electrode 212 and the touch sensing electrode 221 is not specifically limited. As shown in FIG. 11, the touch driving electrode 212 is located at a side of the touch sensing electrode 221 closing the back light module 100. Alternatively, as shown in FIG. 12, the touch driving electrode 212 is located at the side of the touch sensing electrode 221 away from the back light module 100.

Figure 13:
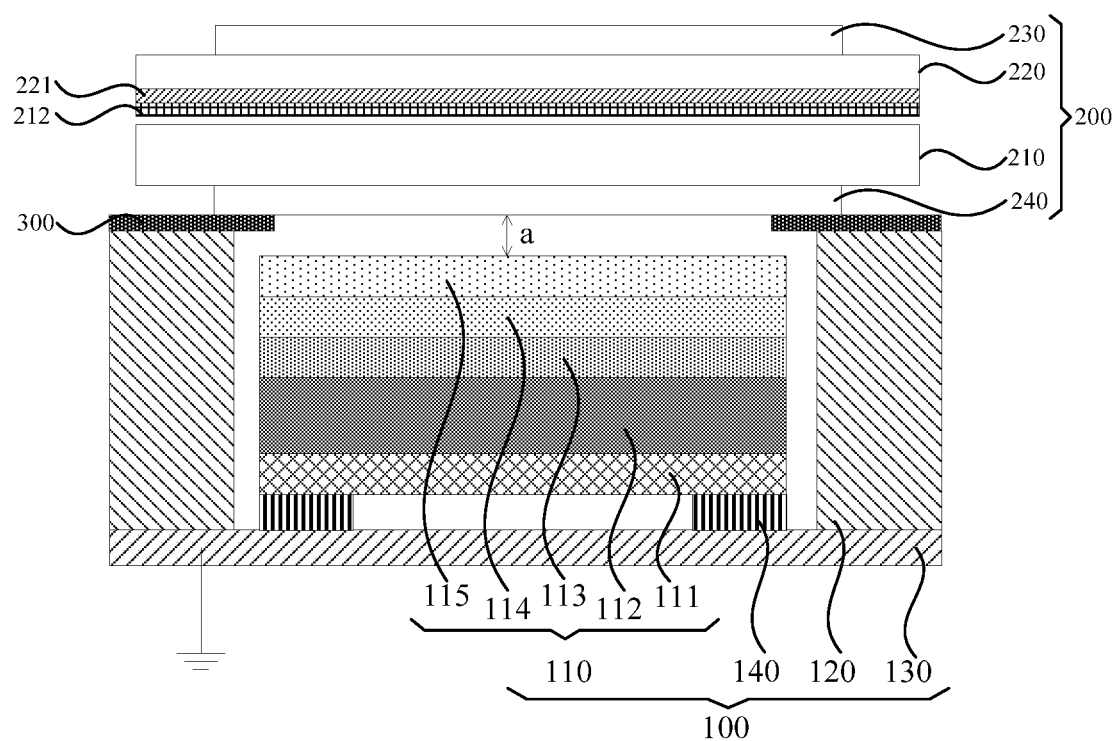
FIG. 13 is a schematic view showing a structure of yet another liquid crystal display apparatus according to an embodiment of the present disclosure.
Figure 14:
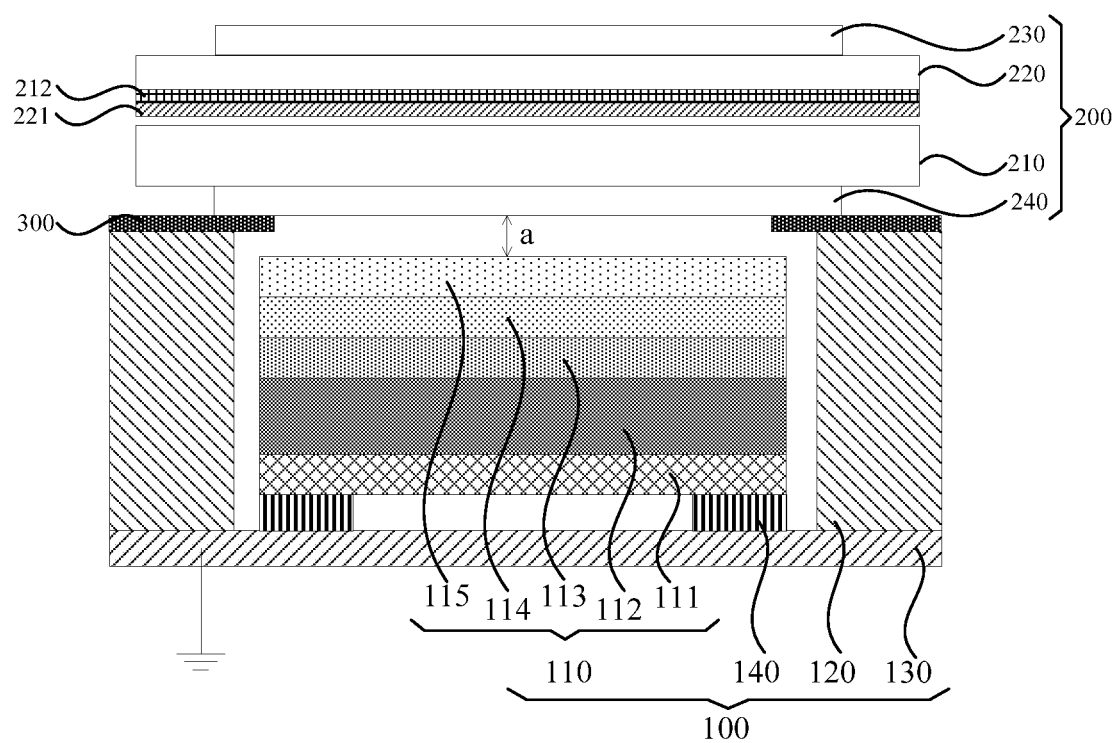
FIG. 14 is a schematic view showing a structure of yet another liquid crystal display apparatus according to an embodiment of the present disclosure.

FIG. 13 is a schematic view showing a structure of yet another liquid crystal display apparatus according to an embodiment of the present disclosure. As shown in FIG. 13, the liquid crystal display apparatus includes a back light module 100 of any embodiment of the present disclosure and a liquid crystal display panel 200. The back light module 100 and the liquid crystal display panel 200 are disposed opposed to each other and connected by a light-proof adhesive tape 300. The liquid crystal display panel 200 includes a force touch electrode. The force touch electrode and the conductive frame 130 of the back light module 100 constitute a force touch apparatus. There exists a gap "a" between the optical film group 110 and the liquid crystal display panel 200. The liquid crystal display panel 200 includes a touch sensing electrode 221 and a touch driving electrode 212. The touch sensing electrode 221 or the touch driving electrode 212 is multiplexed as the force touch electrode. The liquid crystal display panel 200 includes an array substrate 210 and a color filter substrate 220 opposed to each other. Both of the touch driving electrode 212 and the touch sensing electrode 221 are disposed on the color filter substrate 220. It should be noted that, in the present embodiment, the positional relationship between the touch driving electrode 212 and the touch sensing electrode 221 is not specifically limited. As shown in FIG. 13, the touch driving electrode 212 is located at a side of the touch sensing electrode 221 closing the back light module 100. Alternatively, as shown in FIG. 14, the touch driving electrode 212 is located at a side of the touch sensing electrode 221 away from the back light module 100.

Figure 15:
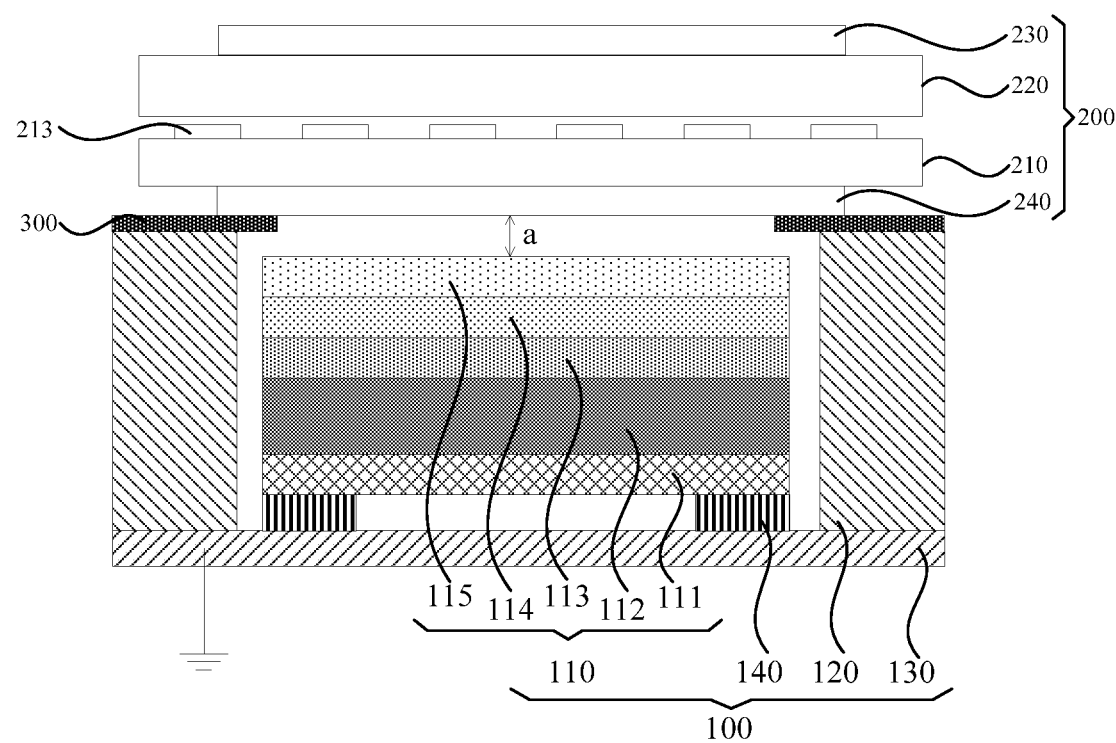
FIG. 15 is a schematic view showing a structure of yet another liquid crystal display apparatus according to an embodiment of the present disclosure.

FIG. 15 is a schematic view showing a structure of yet another liquid crystal display apparatus according to an embodiment of the present disclosure. As shown in FIG. 15, the liquid crystal display apparatus includes a back light module 100 of any embodiment of the present disclosure and a liquid crystal display panel 200. The back light module 100 and the liquid crystal display panel 200 are disposed opposed to each other and connected by a light-proof adhesive tape 300. The liquid crystal display panel 200 includes a force touch electrode. The force touch electrode and the conductive frame 130 of the back light module 100 constitute the force touch apparatus. There exists a gap "a" between the optical film group 110 and the liquid crystal display panel 200. The liquid crystal display panel 200 includes a self-capacitance touch electrode 213, which is multiplexed as the force touch electrode. The liquid crystal display panel 200 includes an array substrate 210 and a color filter substrate 220 opposed to each other. The self-capacitance touch electrode 213 is disposed on the array substrate 210.

It should be noted that each of the array substrate 210 and the color filter substrate 220 includes a multi-layer structure. The self-capacitance touch electrode 213 may disposed at any film position of the array substrate 210 and the color filter substrate 220, under a premise that the self-capacitance touch electrode 213 is capable of realizing the touch function and has no effect on other structural functions. That is, the self-capacitance touch electrode 213 may be disposed at the intermediate film layer position of the array substrate 210 or the color filter substrate 220, or may be disposed at a side of the array substrate 210 closing the color filter substrate 220 or a side of the color filter substrate 220 closing the array substrate 210.

Figure 16:
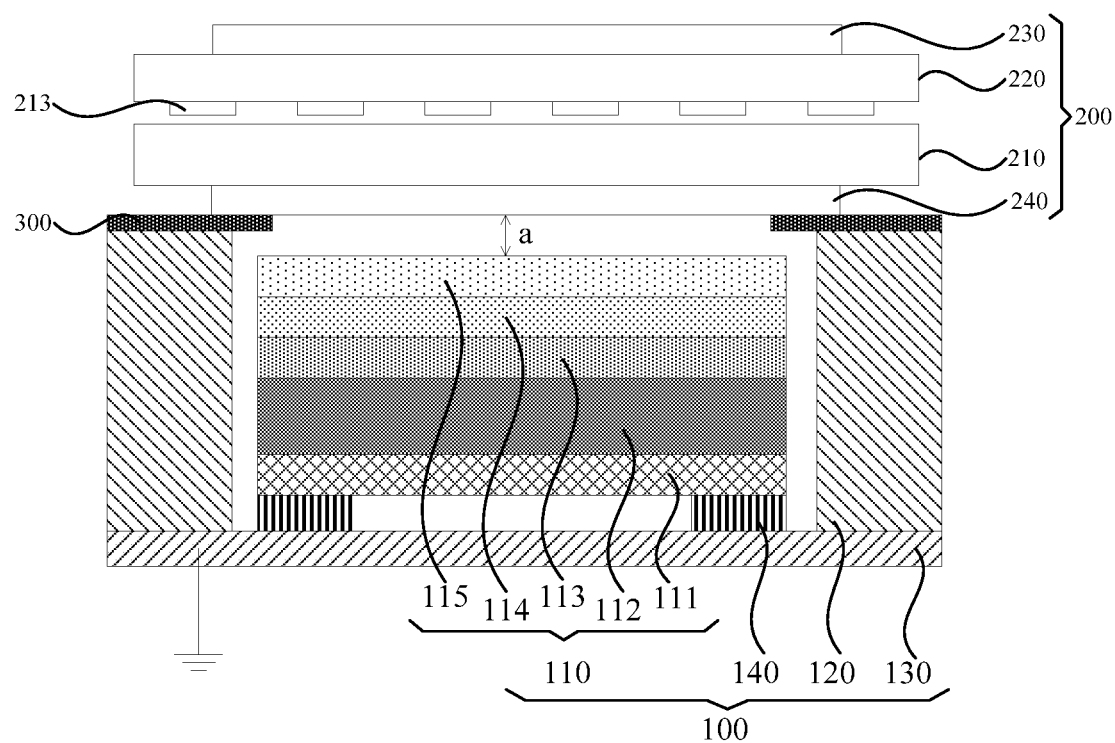
FIG. 16 is a schematic view showing a structure of yet another liquid crystal display apparatus according to an embodiment of the present disclosure.

FIG. 16 is a schematic view showing a structure of yet another liquid crystal display apparatus according to an embodiment of the present disclosure. As shown in FIG. 16, the liquid crystal display apparatus includes a back light module 100 of any embodiment of the present disclosure and a liquid crystal display panel 200. The back light module 100 and the liquid crystal display panel 200 are disposed opposed to each other and connected by a light-proof adhesive tape 300. The liquid crystal display panel 200 includes a force touch electrode. The force touch electrode and the conductive frame 130 of the back light module 100 constitute a force touch apparatus. There exists a gap "a" between the optical film group 110 and the liquid crystal display panel 200. The liquid crystal display panel 200 includes a self-capacitance touch electrode 213, which is multiplexed as the force touch electrode. The liquid crystal display panel 200 includes an array substrate 210 and a color filter substrate 220 opposed to each other. The self-capacitance touch electrode 213 is disposed on the color filter substrate 220.

It should be noted that the embodiments of the disclosure and the technical principles used therein are described as above. It should be appreciated that the disclosure is not limited to the particular embodiments described herein, and any apparent alterations, modification and substitutions can be made without departing from the scope of protection of the disclosure. Accordingly, while the disclosure is described in detail through the above embodiments, the disclosure is not limited to the above embodiments and can further include other additional embodiments without departing from the concept of the disclosure.

What is claimed is:

1. A liquid crystal display apparatus, comprising:
   a back light module and a liquid crystal display panel, wherein the back light module and the liquid crystal display panel are opposed to each other and connected by a light-proof adhesive tape;
   wherein the liquid crystal display panel comprises a force touch electrode;
   wherein the back light module comprises:
   a conductive frame, connected electrically to a reference voltage input terminal;
   a sealant frame, wherein the sealant frame has a bottom surface adhered to a top surface of the conductive frame;
   a support structure displaced above the top surface of the conductive frame along inside edges of the sealant frame;
   a plurality of optical films disposed over the conductive film and being supported by the support structure;
   wherein the force touch electrode in the liquid crystal display panel and the conductive frame of the back light module constitute a force touch assembly; and
   wherein a gap exists between the plurality of optical films and the liquid crystal display panel.

2. The liquid crystal display apparatus according to claim 1, wherein the conductive frame is grounded.

3. The liquid crystal display apparatus according to claim 1, wherein a width of the gap is not greater than a thickness of the light-proof adhesive tape.

4. The liquid crystal display apparatus according to claim 3, wherein the width of the gap is in a range of 0~0.3 mm.

5. The liquid crystal display apparatus according to claim 1, wherein the liquid crystal display panel comprises a touch sensing electrode and a touch driving electrode, and one of the touch sensing electrode and the touch driving electrode is multiplexed as a force touch electrode.

6. The liquid crystal display apparatus according to claim 5, wherein the liquid crystal display panel comprises an array substrate and a color filter substrate opposed to each other, the touch driving electrode is disposed on the array substrate and the touch sensing electrode is disposed on the color filter substrate.

7. The liquid crystal display apparatus according to claim 5, wherein the liquid crystal display panel comprises an array substrate and a color filter substrate opposed to each other, the touch driving electrode is disposed on the color filter substrate and the touch sensing electrode is disposed on the array substrate.

8. The liquid crystal display apparatus according to claim 5, wherein the liquid crystal display panel comprises an array substrate and a color filter substrate opposed to each other, both of the touch driving electrode and the touch sensing electrode are disposed on the array substrate.

9. The liquid crystal display apparatus according to claim 5, wherein the liquid crystal display panel comprises an array substrate and a color filter substrate opposed to each other, both of the touch driving electrode and the touch sensing electrode are disposed on the color filter substrate.

10. The liquid crystal display apparatus according to claim 1, wherein the liquid crystal panel comprises a self-capacitance touch electrode multiplexed as the force touch electrode.

11. The liquid crystal display apparatus according to claim 10, wherein the liquid crystal display panel comprises an array substrate and a color filter substrate opposed to each other, the self-capacitance touch electrode is disposed on the array substrate.

12. The liquid crystal display apparatus according to claim 10, wherein the liquid crystal display panel comprises an array substrate and a color filter substrate opposed to each other, the self-capacitance touch electrode is disposed on the color filter substrate.

13. The liquid crystal display apparatus according to claim 1, wherein the bottom surface of the sealant frame is adhered to the top surface of the conductive frame by a double sided adhesive tape.

14. The liquid crystal display apparatus according to claim 1, wherein the conductive frame is in a flat plate shape.

15. The liquid crystal display apparatus according to claim 1, wherein the conductive frame is an iron frame.

16. The liquid crystal display apparatus according to claim 15, wherein the support structure is a single-sided adhesive tape with the adhesive side sticking to the top surface of the iron frame.

17. The liquid crystal display apparatus according to claim 1, wherein the support structure is a plastic support frame.

18. The liquid crystal display apparatus according to claim 1, wherein a thickness of the support structure is in a range of 0.1~0.3 millimeter.

19. The liquid crystal display apparatus according to claim 1, wherein the plurality of optical films comprises:
an upper brightness enhancement film;
a lower brightness enhancement film;
a diffuser film
a light guide plate; and
a reflector film.

* * * * *